(12) United States Patent
Ryu

(10) Patent No.: US 6,748,301 B1
(45) Date of Patent: Jun. 8, 2004

(54) APPARATUS AND METHOD FOR PREVENTION OF DRIVING OF MOTOR VEHICLE UNDER THE INFLUENCE OF ALCOHOL AND PREVENTION OF VEHICLE THEFT

(76) Inventor: Jae-Chun Ryu, 4-1505, Daehakwon Apt., San 31, Hyoja-dong, Nam-gu, Pohang-city, Kyungsangbuk-do (KR)

( * ) Notice: Subject to any disclaimer, the term of this patent is extended or adjusted under 35 U.S.C. 154(b) by 0 days.

(21) Appl. No.: 10/031,707
(22) PCT Filed: Jul. 24, 1999
(86) PCT No.: PCT/KR99/00403
  § 371 (c)(1),
  (2), (4) Date: Jan. 23, 2002
(87) PCT Pub. No.: WO01/07281
  PCT Pub. Date: Feb. 1, 2001
(51) Int. Cl.[7] ............................................. G06F 19/00
(52) U.S. Cl. ........................ 701/1; 340/426.11; 340/576
(58) Field of Search ........................ 701/1; 340/426.11, 340/426.12, 426.24, 426.25, 426.3, 575, 576

(56) References Cited

U.S. PATENT DOCUMENTS 4,912,458 A * 3/1990 Comeau et al. ............. 340/576
5,704,008 A   12/1997 Duvall et al.
5,774,858 A * 6/1998 Taubkin et al. ............. 704/273
5,983,189 A * 11/1999 Lee ............................. 704/275
2002/0084130 A1 * 7/2002 Der Ghazarian et al. ... 180/272

FOREIGN PATENT DOCUMENTS

| EP | 0373076 | 6/1990 |
|---|---|---|
| EP | 0761514 | 3/1997 |
| FR | 2676686 | 11/1992 |
| GB | 2186448 | 8/1987 |

* cited by examiner

Primary Examiner—Gary Chin
(74) Attorney, Agent, or Firm—Lowe Hauptman Gilman & Berner LLP (57) ABSTRACT

In a voice recognition automobile vehicle capable of recognizing a human voice, an apparatus and method for prevention of driving of motor vehicle under the influence of alcohol (DUI) and prevention of vehicle theft, are provided in which a voice and a voice secret code of at least one authorized driver is stored through the voice recognition apparatus by learning and then only an authorized driver who is not determined to be legally drunk and possesses the same voice and voice secret code as the stored voice and voice secret code can be allowed to start to drive the vehicle. Only an authorized driver having the same voice and voice secret code and not determined to be legally drunk can start the engine of the vehicle.

13 Claims, 5 Drawing Sheets

APPARATUS AND METHOD FOR PREVENTION OF DRIVING OF MOTOR VEHICLE UNDER THE INFLUENCE OF ALCOHOL AND PREVENTION OF VEHICLE THEFT

BACKGROUND OF THE INVENTION

1. Field of the Invention

The present invention relates to a motor vehicle having voice recognition capability, and more particularly, to an apparatus and method for prevention of driving of motor vehicle under the influence of alcohol and prevention of vehicle theft, in which a voice and a voice secret code of an authorized driver is stored through a voice recognition apparatus by learning and then only an authorized operator whose blood alcohol level is within the legally allowed level and who has the same voice and voice secret code as the stored voice and voice secret code can be allowed to operate the vehicle.

In particular, the present invention relates to an apparatus and method for prevention of driving of motor vehicle under the influence of alcohol and prevention of vehicle theft, in which a voice and a voice secret code of an authorized driver is stored by learning through a voice recognition apparatus mounted in the vehicle, and then the breath of an intended operator is detected when the driver says the secret code to check whether or not the operator is legally drunk, and also the intended operator's voice secret code is compared to the stored voice and voice secret code. The driver is allowed to start the vehicle only when the operator is not legally drunk and the voice secret code matches the stored voice secret code.

2. Description of the Related Art

In the prior art, a technology for prevention of driving of motor vehicle under the influence of alcohol and/or a technology for prevention of vehicle theft are available. The technology for prevention of drunk driving uses the results of measurement to determine whether or not the operator is legally drunk, and the vehicle anti-theft technology uses voice recognition results. However, these prior art technologies perform a sobriety check and a voice recognition separately, which is inconvenient for the user.

Further, in the prior art, in the case that a distance between an alcohol sensor and an intended operator is far, it is difficult to accurately measure a blood alcohol level of the operator, and in the case that intensity of an input voice is small, it is not so easy to measure the blood alcohol level state, and further the accuracy of the blood alcohol level measurement is lowered.

Also, in the prior art, in the case that a blood alcohol level check is not performed at the time of a voice secret code speech, a non-drunken operator who is not an authorized driver can operator the vehicle.

SUMMARY OF THE INVENTION

To solve the above problems, it is an objective of the present invention to provide an apparatus and method for prevention of driving of motor vehicle under the influence of alcohol (DUI) and prevention of vehicle theft, in which a voice and a voice secret code of an authorized driver is stored by learning through a voice recognition apparatus mounted in the vehicle, and then the breath of an intended operator is detected when the operator says the voice secret code to check whether or not the operator is legally drunk, and also the intended driver's voice secret code is compared to the stored voice and voice secret code. The driver is allowed to start the vehicle only when the operator is not legally drunk and the voice secret code matches the stored secret code.

It is another objective of the present invention to provide an apparatus and method for prevention of driving of motor vehicle under the influence of alcohol and prevention of vehicle theft, in which a voice recognition apparatus checks whether the intended driver is an authorized driver and whether the driver is legally drunk, to then allow the driver to start the vehicle only when the driver is an authorized driver who is not legally drunk. Accordingly, non-authorized drivers or drivers whose blood alcohol level is above the legally allowed level cannot start the vehicle.

To achieve the objective, there is provided an apparatus for prevention of driving of motor vehicle under the influence of alcohol and prevention of vehicle theft, the apparatus comprising a vehicle key insertion discriminator for detecting whether a vehicle key is inserted into a key hole, a microphone input unit for inputting a voice of an intended driver; a prompt storage unit containing voice prompt or voice guidance; a blood alcohol measuring unit for determining whether the intended driver is legally drunk; a voice recognition processor for receiving the output of the microphone input unit, extracting a voice feature parameter therefrom and voice-synthesizing the prompts stored in the prompt storage unit to then output the synthesized result; a parameter storage unit for storing the voice feature parameter of the voice and voice secret code processed in the voice recognition processor, for one or more authorized drivers; a speaker for converting an electrical signal of the voice prompt or guidance which has been voice-synthesized in the voice recognition processor into a voice signal; and a controller for comparing the input voice feature parameter with the stored voice feature parameter unless the driver is legally drunk according to the results of blood alcohol level measurement, and for controlling the ignition of an engine of the vehicle to start if it is determined that the driver is an authorized driver.

Preferably, the DUI prevention and theft prevention apparatus further comprises: an initial voice secret code learning button for selecting an initial voice secret code learning mode or a mode for erasing a pre-learned voice secret code and resuming an initial voice secret code learning; a voice secret code reset button for resetting a pre-set voice secret code; and a voice loudness discriminator for discriminating the intensity of the input voice, wherein the controller controls the respective blocks to perform the steps of: (a) instructing the voice recognition processor to convert a current mode into an initial voice secret code learning mode by manipulation of the initial voice secret code learning button, simultaneously converting a current mode into a voice secret code learning mode in the case that a key insertion is detected by the vehicle key insertion discriminator, and instructing the voice recognition processor to read a corresponding prompt from the prompt storage unit and voice-synthesize and then output the read result for voice guidance; (b) controlling the voice recognition processor to extract a voice feature parameter from the voice and the voice secret code of the driver having an intensity of a predetermined value or higher input from the microphone input unit, storing the extracted voice feature parameter in the parameter storage unit, and converting the current mode into a normal mode; (c) instructing the voice recognition processor to read a corresponding prompt from the prompt storage unit and voice-synthesize and then output the read result in order to ask the driver what the voice secret code is in the case that the driver intends to start the vehicle by inserting the vehicle key during the normal mode, that is, the key insertion discriminator determines that there has been a new key insertion; (d) determining whether the intensity of the input voice is larger than the predetermined value through the voice strength discriminator when a voice secret code is said; (e) determining whether the driver is legally drunk via the blood alcohol level measurement unit if the voice is louder than the predetermined value in step (d); (f) comparing the feature parameter stored in the parameter storage unit during voice secret code learning with the feature parameter of the voice via the microphone, if the driver is not found to be legally drunk in step (e); (g) outputting a control signal to start the ignition of an engine of the vehicle if it is judged as the same voice and voice secrete code; (h) identifying the voice secret code in order to identify whether the intended driver is an authorized driver in the case that the current mode is converted into a voice secret code learning mode by manipulation of the voice secret code reset button; (i) outputting a voice prompt or guidance for resetting a voice secret code if the driver is an authorized driver; and 0) extracting a voice feature parameter from the voice and the voice secret code of the driver input from the microphone input unit through the voice recognition processor and storing the extracted result in the parameter storage unit.

Preferably, the DUI prevention and theft prevention apparatus further comprises a communication line for transmitting and receiving instructions and information between the controller and the voice recognition processor; and a voice existence discrimination signal line for determining existence of a voice signal in the voice recognition processor using the voice signal received through the microphone input unit and outputting the result to the controller.

According to another aspect of the present invention, there is also provided a method for prevention of driving of motor vehicle under the influence of alcohol and vehicle theft, the method comprising the steps of: (a1) detecting whether a vehicle key is inserted into a key hole; (b1) receiving a voice of an intended driver and extracting a voice feature parameter from the received voice and storing the extracted result; (c1) storing prompts for voice prompt or voice guidance; (d1) determining whether the intended driver is legally drunk by analyzing the breath contents when the voice secret code is said; (e1) extracting a voice feature parameter from the input voice and voice-synthesizing the prompts stored in the prompt storage unit to then output the synthesized result; (f1) converting an electrical signal of the voice prompt or guidance which has been voice-synthesized into a voice signal; and (g1) comparing the input voice feature parameter with the stored voice feature parameter unless the driver is found to be legally drunk in step (d1), and controlling the ignition of the vehicle to start if it is determined that the driver is an authorized driver.

Preferably, the DUI prevention and theft prevention method further comprises: (h1) a voice secret code initial learning step for selecting an initial voice secret code learning mode or a mode for erasing a pre-learned voice secret code and resuming an initial voice secret code learning; (i1) a voice secret code reset step for resetting a pre-set voice secret code; (j1) a voice strength discrimination step for determining the intensity of the input voice; and (k1) converting a current mode into an initial voice secret code learning mode by the initial voice secret code learning step; (l1) simultaneously converting a current mode into a voice secret code learning mode in the case that a key insertion is detected by the vehicle key insertion discrimination step; and (m1) reading a corresponding prompt and voice-synthesizing and then outputting the read result for voice guidance, wherein the comparison and controlling step (g1) comprises the sub-steps of (g2) extracting a voice feature parameter from the input voice and voice secret code of the driver having an intensity of a predetermined value or higher, storing the extracted voice feature parameter, and converting the current mode into a normal mode; (g3) reading a corresponding prompt and voice-synthesizing and then outputting the read result in order to ask the driver what the voice secret code is in the case that the driver intends to start the vehicle by inserting the vehicle key at the normal mode; (g4) determining whether the intensity of the input voice is louder than the predetermined value through the voice strength discrimination step if a voice is input; (g5) determining whether the driver is legally drunk if the voice is louder than the predetermined value; (g6) comparing the feature parameter stored during the voice secret code learning step with the feature parameter of the voice, if the driver is not found to be drunk in step (g5); (g7) outputting a control signal to drive an engine of the vehicle if it is determined to be the same voice and voice secret code; (g8) identifying the voice secret code in order to identify whether the intended driver is an authorized driver in the case that a current mode is converted into a voice secret code learning mode by the voice secret code reset step, and outputting a voice prompt or guidance for resetting a voice secret code if the driver is an authorized driver; and (g9) extracting a voice feature parameter from the voice and the voice secret code of the driver and storing the extracted result.

Preferably, a plurality of authorized drivers' voices and voice secret codes can be set so that a plurality of authorized drivers can start the vehicle as in the case of a family in the DUI prevention and theft prevention method.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Hereinafter, a preferred embodiment of a DUI prevention and vehicle theft apparatus and method according to the present invention will be described with reference to the accompanying drawings FIGS. 1 through 3.

Figure 1:
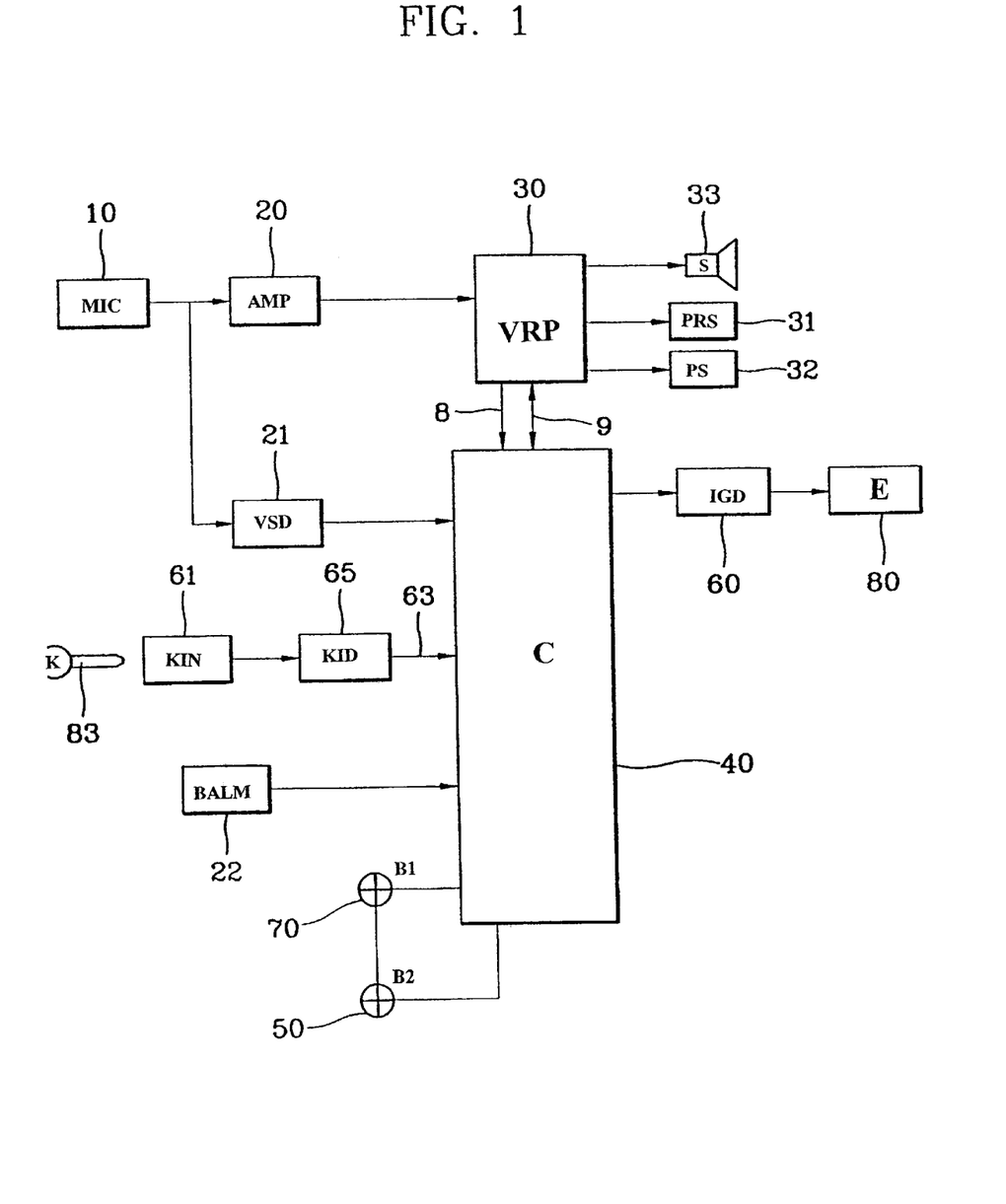
FIG. 1 is a block diagram illustrating a DUI prevention and vehicle theft prevention apparatus.

Referring to FIG. 1, a microphone input unit (MIC) 10 receives a voice of an intended driver, and adopts a general microphone. An amplifier (AMP) 20 amplifies the signal input via the microphone input unit 10. A voice strength discriminator (VSD) 21 discriminates the intensity of the voice input via the microphone 10, by simply measuring the intensity of the voice signal. A prompt storage unit (PS) 32 contains prompts for voice prompt or voice guidance. A blood alcohol level measuring unit (BALM) 22 made of a sensor for sensing the alcohol content in the breath is used to determine whether the intended driver is legally drunk. A voice recognition processor (VRP) 30 receives the output of the microphone amplifier 20, extracts a voice feature parameter therefrom and voice-synthesizes the prompts stored in the prompt storage unit 32 to then output the synthesized result. A parameter storage unit (PRS) 31 stores the voice feature parameter of the voice and voice secret code processed in the voice recognition processor 30, for one or more authorized drivers. A speaker (S) 33 converts an electrical signal of the voice prompt or guidance which has been voice-synthesized in the voice recognition processor 30 into a voice signal. An ignition drive (IGD) 60 starts the engine of the vehicle. The engine (E) 80 is a power generator for the vehicle driven by the drive 60. A vehicle key input portion (KIN) 61 receives the input of a vehicle key (K) 83. A vehicle key insertion discriminator (KID) 65 detects whether a vehicle key 83 is inserted into the key input portion 61 and whether the inserted key is a corresponding vehicle key. A key discrimination signal line 63 is a signal line for outputting a discriminated result by the vehicle key insertion discriminator 65. An initial voice secret code learning button (B1) 70 selects an initial voice secret code learning mode or a mode for erasing a pre-learned voice secret code and resuming an initial voice secret code learning. A voice secret code reset button (B2) 50 resets a pre-set voice secret code.

A controller (C) 40 controls the above-described respective blocks. The controller 40 instructs the voice recognition processor 30 to convert a current mode into an initial voice secret code learning mode by manipulation of the initial voice secret code learning button 70, and to simultaneously convert a current mode into a voice secret code learning mode in the case that a key insertion is detected by the vehicle key discriminator 65, and instructs the voice recognition processor 30 to read a corresponding prompt from the prompt storage unit 32 and voice-synthesize and then output the read result for voice guidance. Then, the controller 40 controls the voice recognition processor 30 to extract a voice feature parameter from the voice and the voice secret code of the driver having an intensity of a predetermined value or higher input from the microphone input unit 10, stores the extracted voice feature parameter in the parameter storage unit 31, and then converts the current mode into a normal mode.

In the normal mode, the controller 40 instructs the voice recognition processor 30 to read a corresponding prompt from the prompt storage unit 32 and voice-synthesize and then output the read result in order to ask the driver what the voice secret code is in the case that the driver intends to start the vehicle by inserting the vehicle key, that is, the key insertion discriminator determines that there has been a new key insertion in the key input portion 61. Then, the controller 40 determines whether the intensity of the input voice is louder than the predetermined value through the voice strength discriminator 21 if a voice is input. Then, the controller 40 determines whether the driver is legally drunk via the blood alcohol level measurement unit 22 if the voice is louder than the predetermined value. Then, the controller 40 compares the feature parameter stored in the parameter storage unit 31 during the voice secret code learning with the feature parameter of the voice input via the microphone, if the driver is not found to be legally drunk. Then, the controller 40 outputs a control signal to the engine driver 60 to drive the engine 80 of the vehicle if it is determined as the same voice and voice secret code.

Meanwhile, in the case that a current mode is converted into a voice secret code learning mode by manipulation of the voice secret code reset button 50, the controller 40 identifies the voice secret code in order to determine whether the intended driver is an authorized driver, and outputs a voice prompt or guidance for resetting a voice secret code if the driver is an authorized driver. Then, the controller 40 extracts a voice feature parameter from the voice and the voice secret code of the driver input from the microphone input portion 10 through the voice recognition processor 30 and stores the extracted result in the parameter storage unit 31.

A communication line 9 is provided between the controller 40 and the voice recognition processor 30, for transmitting and receiving instructions and information therebetween. A voice existence discrimination signal line 8 determines existence of a voice signal in the voice recognition processor 30 using the voice signal received through the microphone input portion 10 and outputs the result to the controller 40.

In the DUI prevention and vehicle theft prevention apparatus according to the present invention, it is not possible for an authorized driver who is legally drunk or a non-authorized driver to start the vehicle through the above-described configuration, to thereby prevent a driving of the vehicle while the driver is legally drunk as well as theft of the vehicle.

In the DUI prevention and vehicle theft prevention apparatus according to the present invention, the breath of an intended driver must be analyzed by a blood alcohol level measuring unit, for example, an alcohol sensing unit 22, in order to determine the sobriety of the driver. For this purpose, the present invention induces the driver to say a voice secret code in a voice louder than a predetermined value. A voice strength discriminator 21 determines the intensity of the input voice. In this case, if the intensity of an input voice is lower than the predetermined value, it becomes difficult to perform breath analysis in the blood alcohol level measurement unit 22. Accordingly, the driver is requested to say a voice secret code again in a louder voice. As an example, a voice prompt such as a voice guidance <Please speak in a louder voice> is read from the prompt storage unit 32, and voice-synthesized in the voice recognition processor 30 to then be output.

In the normal mode, a query with respect to a voice secret code of an intended driver is output via the speaker 33 whenever a vehicle key is inserted into the key input portion. If the input voice secret code is incorrect three or more times, or the intended driver is legally drunk, the present invention is configured such that the vehicle cannot be driven. In addition, a voice secret code of the driver can be reset by the voice secret code reset button 50 in the normal mode. Further, in the case that a previously set voice secret code cannot be remembered, an initial voice secret code learning can be performed again by pressing the initial voice secret code learning button 70.

Voice feature parameter extraction algorithms such as Dynamic Time Warping (DTW) and Hidden Markov Model (HMM) which can be used in the voice recognition processor 30 are widely known to one skilled in the art. Thus, the detailed description thereof will be omitted. Also, in the case of algorithms for voice signal existence discrimination such as a ZCR (Zero Crossing Rate) method and a formant method which can be used in the present invention, the detailed description thereof will be omitted as well.

The operation of the DUI prevention and vehicle theft prevention apparatus of the vehicle according to the present invention will be described below with reference to the accompanying drawings.

No voice secret code is learned in a vehicle when it is initially purchased. Such a newly purchased vehicle is at an initial voice secret code learning mode. At this time, if a purchaser inserts a corresponding vehicle key into the vehicle key input portion 61 at the initial voice secret code learning mode, a voice guidance broadcast such as a voice prompt necessary for setting an initial voice secret code is output via the speaker 33. For example, a prompt such as a guiding broadcast <Please set a desired password> is output via the speaker 33. Then, if the purchaser says a password, that is, a voice secret code with his or her own voice, the voice is stored in the storage unit 31 in the form of a parameter and then a voice secret code learning process is completed. Thereafter, the voice feature parameter is used as a comparison reference when a voice secret code is needed whenever the vehicle key is newly inserted into the key input portion at the normal mode. If the intensity of the voice is low during the voice secret code learning process, the driver is requested to say the voice secret code again so as to be learned. As an example, a voice prompt such as <Please say in a louder voice> is output.

Meanwhile, in the case that the DUI prevention and vehicle theft prevention apparatus is converted into a voice secret code learning mode by the voice secret code reset button 50, a voice guidance broadcast such as a voice prompt necessary for resetting a voice secret code is output via the speaker 33. For example, a prompt such as a guiding broadcast <Please say your password> is output via the speaker 33 in order to identify an authorized driver in advance. Then, if the driver says the password in his or her own voice, the voice is identified with the parameter stored in the storage unit 31 to determine whether the intended driver is an authorized driver. If the intended driver is an authorized driver, a prompt such as a voice guidance broadcast <Please say password> is output via the speaker. Then, if the driver says a new password in his or her own voice, the voice is stored in the storage unit 31 and then a voice secret code resetting process is completed. Thereafter, the voice feature parameter is used to identify a voice secret code whenever the vehicle key is newly inserted into the key input portion at the normal mode. If the intensity of the voice is low during the voice secret code resetting process, the driver is requested to say the voice secret code in a louder voice so as to be learned. As an example, a voice prompt such as <Please say in a louder voice> is output.

Also, a guidance message such as a voice prompt is output via the speaker in order to identify an authorized driver whenever the vehicle key is newly inserted into the vehicle key input portion 61 at the normal mode. For example, a prompt such as a guiding broadcast <Please say password> is output via the speaker 33 in order to identify an authorized driver. Then, if the driver says the password in his or her own voice, the voice is identified with the parameter stored in the storage unit 31 to determine whether the intended driver is an authorized driver. At the same time, it is determined whether the voice has an intensity louder than a predetermined value. If the intensity of the voice is low, it is difficult to determine the blood alcohol level due to insufficient amount of breath to be analyzed. Thus, a voice prompt such as <Please say in a louder voice> is output again.

If it is determined that the driver is an authorized driver who is not legally drunk, a prompt such as <Hello. Please drive safely> is output via the speaker and the vehicle is automatically started. If the driver is determined to be a legally drunk driver, a warning message is output, in which case a prompt such as <Your blood alcohol level is above the legal limit. Please drive after you have sobered up> is output.

Figure 2:
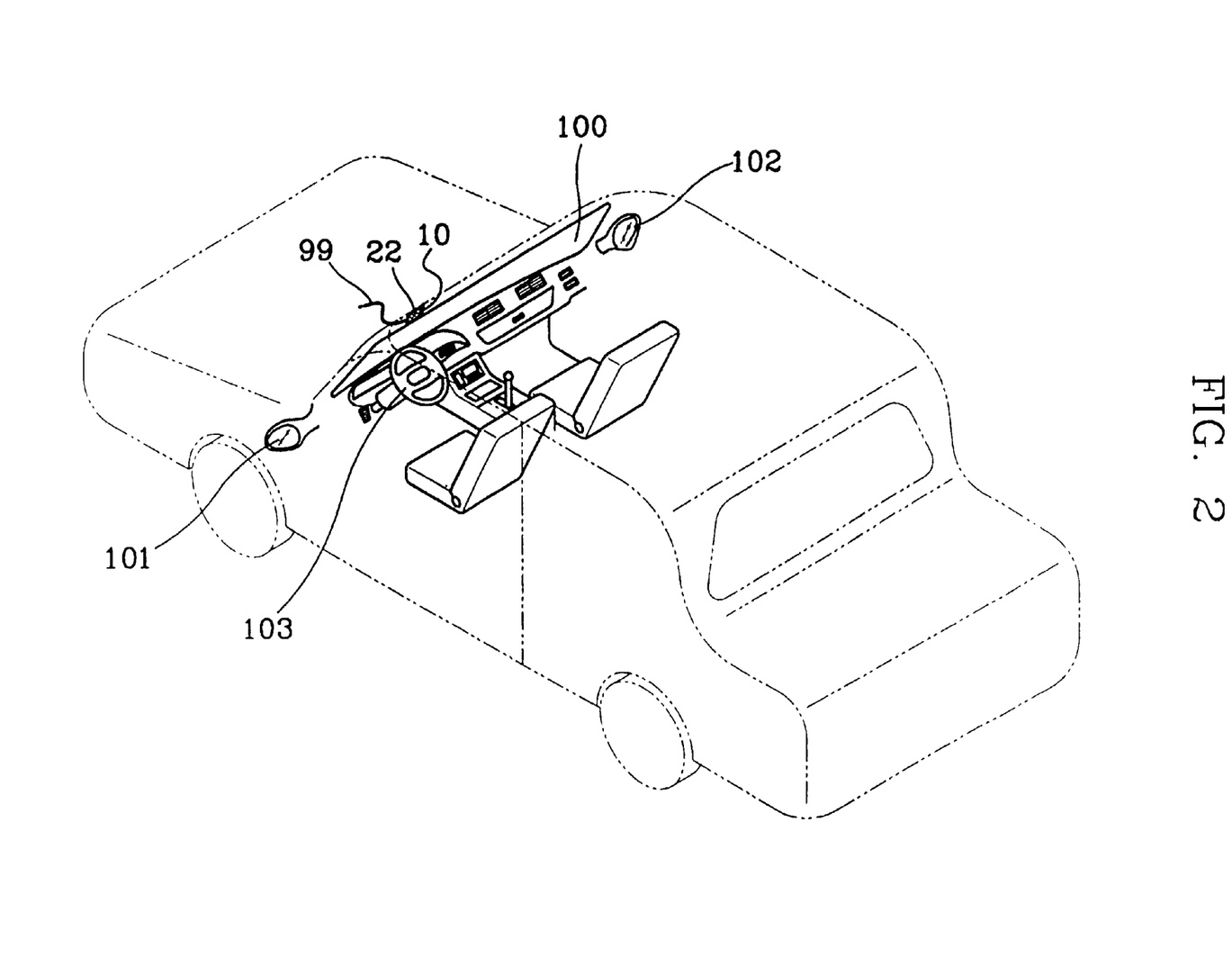
FIG. 2 is a view showing an automobile vehicle to which the DUI prevention and theft prevention method and apparatus according to a preferred embodiment of the present invention is applied.

Referring to FIG. 2, the DUI prevention and vehicle theft prevention apparatus according to the present invention is installed in an automobile vehicle. Reference numeral 100 denotes the front glass panel of the vehicle, and reference numerals 101 and 102 denote left- and right-side view mirrors. Also, reference numeral 103 denotes the steering wheel. Above the steering wheel are provided the microphone input portion 10 receiving the voice of an intended driver and the blood alcohol level measuring unit 22 for determining the blood alcohol level of the driver which are directed toward the driver from the ceiling of the vehicle by means of a wiring path unit 99. Since the microphone input portion 10 and the blood alcohol level measuring unit 22 are close to each other, the breath of the driver can be easily analyzed when the driver speaks.

Figure 3A:
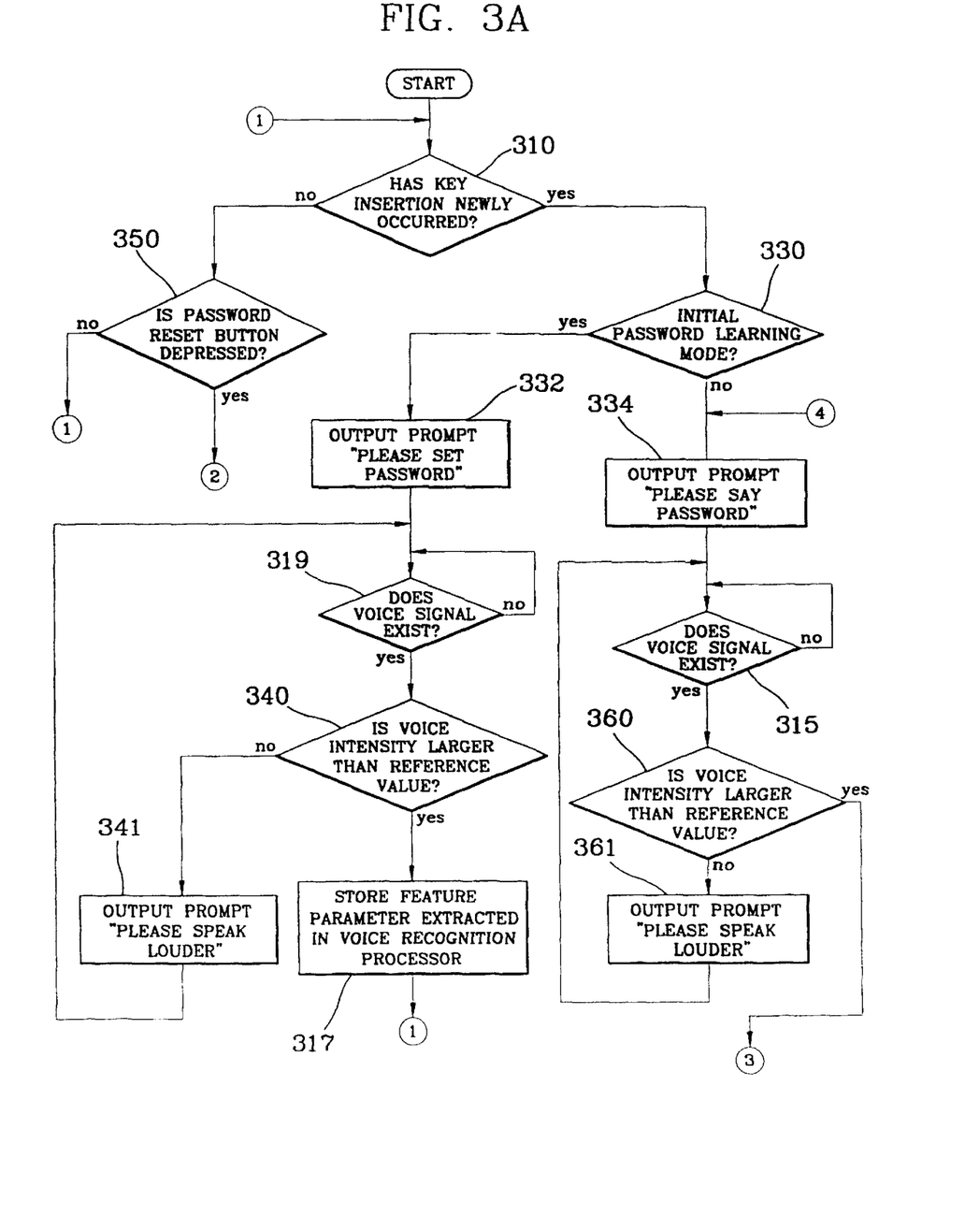
FIGS. 3a, 3b and 3c is a flow chart for explaining the operation of the DUI prevention and vehicle theft prevention method according to the present invention.
Figure 3B:
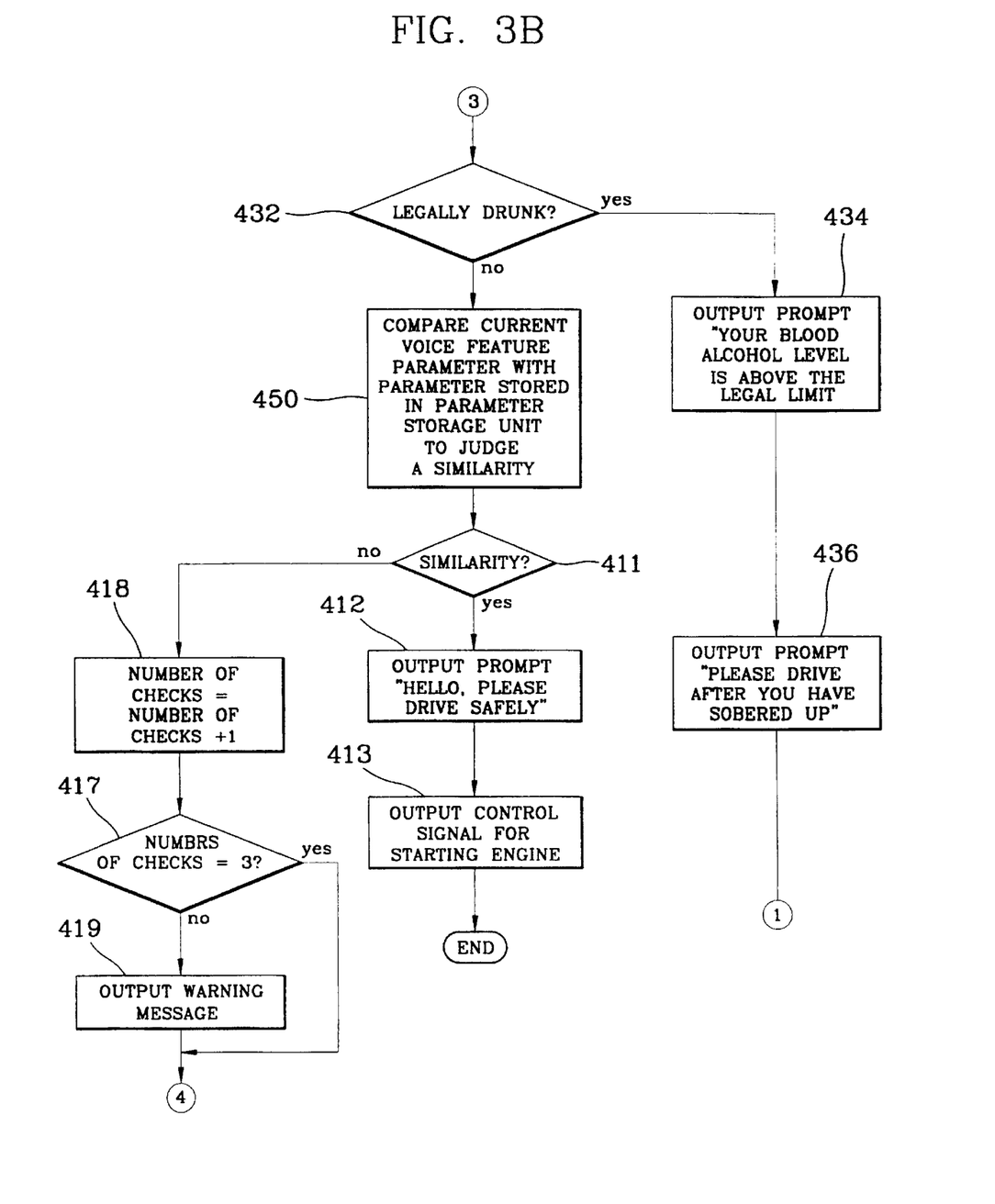
Figure 3C:
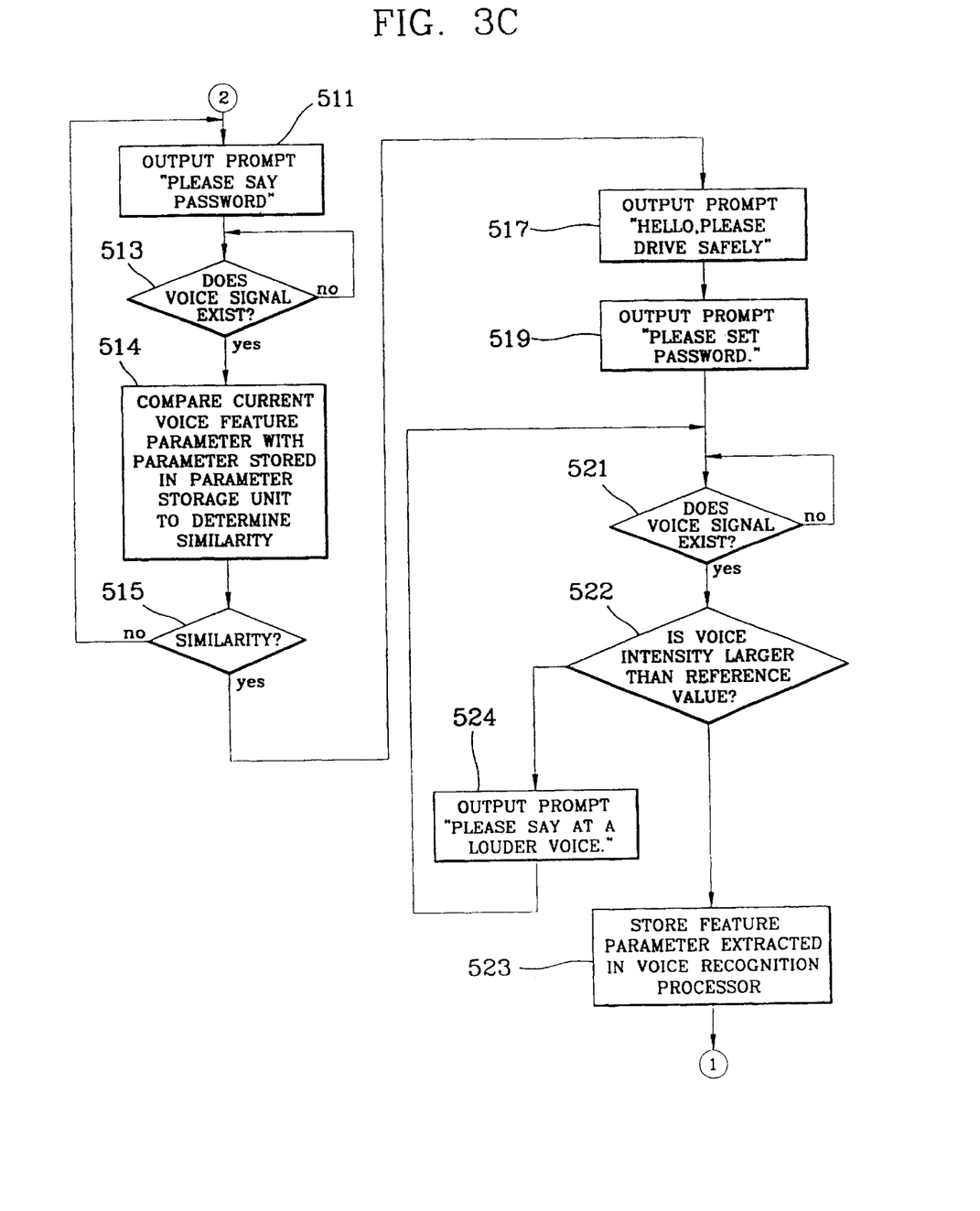

Referring to FIGS. 3a through 3c, the function and effect of the DUI prevention and vehicle theft prevention apparatus and method according to the present invention will be described below.

Referring to FIG. 3a, according to a main program of the controller 40, it is checked whether a corresponding vehicle key is newly inserted into the vehicle key input portion 61 via a key discrimination signal line 63 from the key insertion discriminator 65 (step 310). That is, according to the insertion of the vehicle key 83, it is checked whether an intended driver wishes to start to drive the vehicle. If the vehicle key is newly inserted, it is checked whether a current mode is an initial voice secret code leaning mode (step 330). In step 330, if the current mode is the initial voice secret code learning mode, the controller 40 instructs the voice recognition processor 30 so that a prompt such as <Please say a desired password> is read from the prompt storage unit 32 containing the voice prompts or voice guidance messages in order to store the voice secret code of the driver by learning, and the prompt is voice-synthesized to then be output (step 332). Then, the controller 40 awaits a voice input from the microphone input portion 10, which is performed by checking the voice existence discrimination signal line 8 (step 319).

If there exists a voice signal input in step 319, the voice strength discriminator 21 discriminates whether the intensity of the voice is louder than a reference value (step 340). If the voice intensity is lower than the reference value, a voice prompt such as <Please say in a louder voice> is output since it is difficult to analyze the breath of the driver, in order to induce the driver to say the voice secret code in a louder voice (step 341). Then, the controller 40 awaits a voice input (step 319). If a voice having a voice intensity higher than the reference value is input in step 340, the controller 40 instructs the voice recognition processor 30 via the communications line 9, to extract a voice feature parameter from the input voice signal and store the extracted voice feature parameter in the parameter storage unit 31 (step 317), to then complete a voice secret code learning set process. Thereafter, since the initial voice secret code learning is completed, the current mode is converted into a normal mode.

If the current mode is not an initial learning mode in step 330, that is, the current mode is the normal mode, the controller 40 instructs the voice recognition processor 30 so that a prompt such as <Please say password> is read from the prompt storage unit 32 in order to ask the driver of a voice secret code, and the prompt is voice-synthesized to then be output (step 334). Then, the controller 40 awaits a voice input from the microphone input portion 10, which is performed by checking the voice existence discrimination signal line 8 (step 315).

Referring to FIGS. 3a and 3b, if a voice signal exists, it is first determined whether the driver is legally drunk and then whether the driver is an authorized driver by checking a voice secret code. That is, if a voice signal input exists, it is determined whether the intensity of the input voice is higher than the reference value (step 360 of FIG. 3a). If the intensity of the voice is higher than the reference value, the blood alcohol level measuring unit 22 determines whether the driver is legally drunk (step 432 of FIG. 3b). If the driver is not legally drunk, the controller 40 instructs the voice recognition processor 30 to compare the currently input voice feature parameter with the voice feature parameter which has been stored by learning in the storage unit 31 in advance in order to identify the voice secret code, and receives the comparison result via the communications line 9 (step 450). The comparison result is expressed as a figure representing similarity. As an example, the comparison method is accomplished by a sum of the differences in the two parameters. In this case, if the figure is small, the voice is similar, while if the figure is large, the voice is not similar.

It is determined whether the figure is less than the reference value in step 411. That is, the similarity of the voice is determined in step 411. If the voice is similar, the driver is an authorized driver. Thus, the controller 40 instructs the voice recognition processor 30 so that a prompt such as <Hello. Please drive safely> is read from the prompt storage unit 32, and the prompt is voice-synthesized to then be output (step 412). The controller 40 outputs a control signal to the engine driver 60 in order to start the engine 80 (step 413).

Referring again to FIG. 3a, in the case that the driver speaks in a voice whose intensity is lower than the reference value in step 360, a prompt such as <Please say in a louder voice> is output (sep 361). Then, the controller awaits a voice input (step 315).

In step 411 of FIG. 3b, if it is determined that the driver is not an authorized driver, similarity is determined by a predetermined number of times, for example, in this embodiment, up to three times through steps 418 and 417. If the driver is not an authorized driver, a warning notice sound is output via the speaker 33 (step 419). If it is determined that the driver is legally drunk in step 432, a warning message is output (steps 434 and 436). That is, a prompt such as <Your blood alcohol level is above the legal limit. Please drive after you have sobered up> is output.

If there is no new insertion of the vehicle key in step 310 of FIG. 3a, it is checked whether the voice secret code reset button 50 is depressed (step 350). If the reset button 50 has been depressed, the driver is asked the voice secret code in order to determine the authorized driver as shown in FIG. 3c. That is, the controller 40 instructs the voice recognition processor 30 so that a prompt such as <Please say password> is read from the prompt storage unit 32, and the prompt is voice-synthesized to then be output (step 511). Then, the controller 40 awaits a voice input from the microphone input portion 10, which is performed by checking the voice existence discrimination signal line 8 (step 513).

If there exists a voice input in step 513, the controller 40 instructs the voice recognition processor 30 to compare the currently input voice feature parameter with the voice feature parameter which has been stored by learning in the storage unit 31 in advance in order to identify the voice secret code, and receives the comparison result via the communications line 9 (step 514). The companion result is expressed as a figure representing similarity. As an example, the comparison method is accomplished by a sum of the differences in the two parameters. In this case, if the figure is small, the voice is similar, while if the figure is large, the voice is not similar.

It is determined whether the voice is similar in step 515 of FIG. 3c. If the driver is an authorized driver, the controller 40 instructs the voice recognition processor 30 so that a prompt such as <Hello. Please drive safely> is read from the prompt storage unit 32, and the prompt is voice-synthesized to then be output (step 517). Then, the controller 40 instructs the voice recognition processor 30 so that a prompt such as <Please set a desired password> is read from the prompt storage unit 32 in order to reset a voice secret code of the driver, and the prompt is voice-synthesized to then be output (step 519). Then, the controller 40 awaits a voice input from the microphone input portion 10, which is performed by checking the voice existence discrimination signal line 8 (step 521).

If a voice input exists, it is determined whether the intensity of the input voice is larger than the reference value (step 513). If the voice signal has an intensity larger than the reference value, the controller 40 instructs the voice recognition processor 30 via the communications line 9, to extract a voice feature parameter from the input voice signal and store the extracted voice feature parameter in the parameter storage unit 31, to then reset a voice secret code reset process (step 523). If the voice is not similar in step 515, the driver is asked again for the password.

In the case that the driver speaks in a voice having an intensity less than the reference value in step 513, a prompt such as <Please say in a louder voice> is output (step 524). The controller 40 awaits a new voice input (step 521).

Up to now, the DUI prevention and vehicle theft prevention apparatus, and method according to the present invention has been described with respect to only the case in which the vehicle key is inserted into the key hole, which is discriminated through a vehicle key insertion discrimination step. However, the present invention can be designed to first discriminate a voice and a voice secret code in order to be applied to a vehicle employing a remote starting apparatus, to thereby start the engine of the vehicle, rather than starting the engine by key insertion.

As described above, the DUI prevention and vehicle theft prevention apparatus and method according to the present invention prevents accidents and thwarts vehicle theft, by use of a voice recognition apparatus and a blood alcohol level measurement unit, in which a voice and a voice secret code are stored in advance by learning in the voice recognition apparatus mounted in the vehicle, with a result that only an authorized driver having the same voice and voice secret code and not legally drunk can start the engine of the vehicle.

The present invention is not limited to the above-described embodiment and various modifications and changes may be effected by one skilled in the art within the scope of the present invention.

The DUI prevention and vehicle theft prevention apparatus and method according to the present invention can be used in hazardous work environments such as machines which prevents non-authorized persons from using them as well as vehicles.

What is claimed:

1. An apparatus for prevention of driving of motor vehicle under the influence of alcohol (DUI) and prevention of vehicle theft, the apparatus comprising:

a vehicle key insertion discriminator for detecting whether a vehicle key is inserted into a key hole;

a microphone input unit for inputting a voice and a voice secret code of an intended driver;

a prompt storage unit containing prompts for voice prompt or voice guidance;

a blood alcohol level measuring unit for determining whether the intended driver is legally drunk;

a voice recognition processor for receiving the output of the microphone input unit, extracting a voice feature parameter therefrom and voice-synthesizing the prompts stored in the prompt storage unit to then output the synthesized result;

a parameter storage unit for storing the voice feature parameter of the voice and voice secret code processed in the voice recognition processor, for one or more authorized drivers;

a speaker for converting an electrical signal of the voice prompt or guidance which has been voice-synthesized in the voice recognition processor into a voice signal; and a controller for comparing the input voice feature parameter with the stored voice feature parameter unless the driver is legally drunk as determined by the blood alcohol level measuring unit, and for controlling the ignition of the engine of the vehicle if it is determined that the drive is an authorized driver.

2. The DUI prevention and vehicle theft prevention apparatus according to claim 1, further comprising:

an initial voice secret code learning button for selecting an initial voice secret code learning mode or a mode for erasing a pre-learned voice secret code and resuming an initial voice secret code learning;

a voice secret code reset button for resetting a pre-set voice secret code; and a voice strength discriminator for discriminating the intensity of the input voice, wherein said controller performs the steps of:

(a) instructing the voice recognition processor to convert a current mode into said initial voice secret code learning mode by manipulation of the initial voice secret code learning button, simultaneously converting said current mode into a voice secret code learning mode in the case that a key insertion is detected by the vehicle key insertion discriminator, and instructing the voice recognition processor to read a corresponding prompt from the prompt storage unit and voice-synthesize and then output the read result for voice guidance;

(b) controlling the voice recognition processor to extract said voice feature parameter from the voice and the voice secret code of the driver having an intensity of a predetermined value or more input from the microphone input unit, storing the extracted voice feature parameter in the parameter storage unit, and converting the current mode into a normal mode;

(c) instructing the voice recognition processor to read a corresponding prompt from the prompt storage unit and voice-synthesize and then output the read result in order to ask the driver what the voice secret code is in the case that the driver intends to start the vehicle by inserting the vehicle key in the normal mode, that is, the key insertion discriminator judges that there has been a new key insertion;

(d) determining whether the intensity of the input voice is higher than the predetermined value through the voice strength discriminator if a voice is input;

(e) determining whether the driver is legally drunk via the blood alcohol level measuring unit if the voice is louder than the predetermined value in step (d);

(f) comparing the feature parameter stored in the parameter storage unit during the voice secret code learning with the feature parameter of the voice input via the microphone, if the driver is not determined to be legally drunk in step (e);

(g) outputting a control signal to drive said engine of the vehicle if it is judged as the same voice and voice secret code;

(h) identifying the voice secret code in order to identify whether the intended driver is an authorized driver in the case that said current mode is converted into said voice secret code learning mode by manipulation of the voice secret code reset button;

(i) outputting a voice prompt or guidance for resetting said voice secret code if the driver is an authorized driver; and (j) extracting said voice feature parameter from the voice and the voice secret code of the driver input from the microphone input unit through the voice recognition processor and storing the extracted result in the parameter storage unit.

3. The DUI prevention and vehicle theft prevention apparatus according to claim 1, further comprising a communication line for transmitting and receiving instructions and information between the controller and the voice recognition processor; and a voice existence discrimination signal line through which the voice recognition processor outputs a voice existence signal to the controller.

4. A method for prevention of driving of motor vehicle under the influence of alcohol (DUI) and prevention of vehicle theft, the method comprising the steps of:

(a1) detecting whether a vehicle key has been inserted into a key hole;

(b1) receiving a voice of an intended driver and extracting a voice feature parameter from the received voice and storing the extracted result;

(c1) storing prompts for voice prompt or voice guidance;

(d1) determining whether the intended driver is legally drunk from analysis of the breath of the driver;

(e1) extracting a voice feature parameter from the input voice and voice-synthesizing the prompts stored in the prompt storage unit to then output the synthesized result;

(f1) converting a voice prompt electrical signal of the voice prompt or guidance which has been voice-synthesized into a voice signal; and (g1) comparing the input voice feature parameter with the stored voice feature parameter unless the driver is found to be legally drunk in step (d1), and controlling an engine of the vehicle to start if it is determined that the driver is an authorized driver.

5. The DUI prevention and vehicle theft prevention method according to claim 4, further comprising:

(h1) an initial voice secret code learning step for selecting an initial voice secret code learning mode or a mode for erasing a pre-learned voice secret code and resuming an initial voice secret code learning;

(i1) a voice secret code reset step for resetting a pre-set voice secret code;

(j1) a voice strength discrimination step for discriminating the intensity of the input voice;

(k1) converting a current mode into said initial voice secret code learning mode by the initial voice secret code learning step;

(l1) simultaneously converting said current mode into a voice secret code learning mode in the case that a key insertion is detected by the vehicle key insertion discrimination step; and (m1) reading a corresponding prompt and voice-synthesizing and then outputting the read result for voice guidance, wherein the comparison and controlling step (g1) comprises the sub-steps of:

(g2) extracting said voice feature parameter from the input voice and voice secret code of the driver having an intensity of a predetermined value or higher, storing the extracted voice feature parameter, and converting the current mode into a normal mode;

(g3) reading a corresponding prompt and voice-synthesizing and then outputting the read result in order to ask the driver what the voice secret code is in the case that the driver intends to start the vehicle by inserting the vehicle key at the normal mode;

(g4) determining whether an intensity of the input voice is larger than the predetermined value through the voice strength discrimination step if a voice is input;

(g5) determining whether the driver is legally drunk if the voice is louder than the predetermined value;

(g6) comparing the feature parameter stored during the voice secret code learning step with the feature parameter of the input voice, if the driver is not determined to be legally drunk in step (g5);

(g7) outputting a control signal to start the engine of the vehicle if it is determined to be the same voice and voice secret code;

(g8) identifying the voice secret code in order to determine whether the intended driver is an authorized driver in the case that said current mode is converted into said voice secret code learning mode by the voice secret code reset step, and outputting a voice prompt or guidance for resetting said voice secret code if the driver is an authorized driver; and (g9) extracting said voice feature parameter from the voice and the voice secret code of the driver and storing the extracted result.

6. An apparatus for prevention of driving of motor vehicle under the influence of alcohol (DUI) and prevention of vehicle theft, the apparatus comprising:

a microphone input unit for converting a voice of an intended driver into an electrical signal;

a prompt storage unit containing prompts for voice prompt or voice guidance;

a voice strength discriminator for discriminating the intensity of the input voice;

a blood alcohol level measuring unit for determining whether the intended driver is legally drunk;

a voice recognition processor for receiving the output of the microphone input unit, extracting a voice feature parameter therefrom and voice-synthesizing the prompts stored in the prompt storage unit to then output the synthesized result;

a parameter storage unit for storing the voice feature parameter of the voice and voice secret code processed in the voice recognition processor, for one or more authorized drivers;

a speaker for converting an electrical signal of the voice prompt or guidance which has been voice-synthesized in the voice recognition processor into a voice signal;

a vehicle key input unit for receiving a vehicle key;

a vehicle key discriminator for discriminating whether the key inserted into the vehicle key input unit is a corresponding key of the vehicle;

an initial voice secret code learning button for selecting an initial voice secret code learning mode or a mode for erasing a pre-learned voice secret code and resuming an initial voice secret code learning;

a voice secret code reset button for resetting a pre-set voice secret code; and a controller for performing the steps of:

(a) instructing the voice recognition processor to convert a current mode into said initial voice secret code learning mode by manipulation of the initial voice secret code learning button, simultaneously converting said current mode into a voice secret code learning mode in the case that a key insertion is detected by the vehicle key insertion discriminator, and instructing the voice recognition processor to read a corresponding prompt from the prompt storage unit and voice-synthesize and then output the read result for voice guidance;

(b) controlling the voice recognition processor to extract said voice feature parameter from the voice and the voice secret code of the driver having an intensity of a predetermined value or higher input from the microphone input unit, storing the extracted voice feature parameter in the parameter storage unit, and converting the current mode into a normal mode;

(c) instructing the voice recognition processor to read a corresponding prompt from the prompt storage unit and voice-synthesizing and then outputting the read result in order to ask the driver what the voice secret code is in the case that the driver intends to start the vehicle by inserting the vehicle key at the normal mode, that is, the key insertion discriminator determines that there has been a new key insertion;

(d) determining whether the intensity of the input voice is higher than the predetermined value through the voice strength discriminator if a voice is input;

(e) determining whether the driver is legally drunk via the blood alcohol level measuring unlit if the voice is louder than the predetermined value in step (d);

(f) comparing the feature parameter stored in the parameter storage 15 unit; during the voice secret code learning with the feature parameter of the voice via the microphone, if the driver is not determined to be drunk in step (e);

(g) outputting a control signal to drive an engine of the vehicle if it is judged as the same voice and voice secret code;

(h) identifying the voice secret code in order to identify whether the intended driver is an authorized driver in the case that said current mode is converted into said voice secret code learning mode by manipulation of the voice secret code reset button;

(i) outputting a voice prompt or guidance for resetting said voice secret code if the driver is an authorized driver; and (j) extracting said voice feature parameter from the voice and the voice secret code of the driver input from the microphone input unit through the voice recognition processor and storing the extracted result in the parameter storage unit.

7. The DUI prevention and vehicle theft prevention apparatus according to claim 6, wherein one of the voice prompts during the voice secret code learning mode is a prompt <Please say your desired password>.

8. The DUI prevention and vehicle theft prevention apparatus according to claim 7, wherein said prompt for asking the driver of a voice secret code during the voice secret code learn mode is a prompt <Please say password>.

9. The DUI prevention and vehicle theft prevention apparatus according to claim 8, wherein in the case that the driver is determined to be legally drunk by said blood alcohol level measuring unit, a prompt <Your blood alcohol level is above the legal limit, Please drive after you have sobered up> is output.

10. The DUI prevention and vehicle theft prevention apparatus according to claim 9, herein in the case that it is judged in said voice strength discriminator that the intensity of the input voice is lower than a reference value, a prompt <Please say in a louder voice> is output.

11. An apparatus for prevention of driving of a motor vehicle and prevention of vehicle theft, the apparatus comprising:
- a microphone input unit for converting a voice of an intended driver into an electrical signal;
- a prompt storage unit containing prompts for voice prompt or voice guidance;
- a blood alcohol level measuring unit for determining whether the intended driver is legally drunk;
- a voice recognition processor for receiving the output of the microphone input unit, extracting a voice feature parameter therefrom and voice-synthesizing the prompts stored in the prompt storage unit to then output the synthesized result;
- a parameter storage unit for storing the voice feature parameter for the voice and voice secret code processed in the voice recognition processor, for one or more authorized drivers;
- a speaker for converting an electrical signal of the voice prompt or guidance which has been voice-synthesized in the voice recognition processor into a voice signal;
- an ignition drive for starting an engine of the vehicle;
- a vehicle key input unit for receiving a vehicle key;
- a vehicle key insertion discriminator for detecting whether the vehicle key inserted into a key hole is a corresponding vehicle key;
- an initial voice secret code learning button for selecting an initial voice secret code learning mode or a mode for erasing a pre-learned voice secret code and resuming an initial voice secret code learning;
- a voice secret code reset button for resetting a pre-set voice secret code; and a controller for performing the steps of:
  - (a) instructing the voice recognition processor to convert a current mode into said initial voice secret code learning mode by manipulation of the initial voice secret code learning button, simultaneously converting said current mode into a voice secret code learning mode in the case that a key insertion is detected by the vehicle key insertion discriminator, and instructing the voice recognition processor to read a corresponding prompt from the prompt storage unit and voice-synthesize and then output the read result for voice guidance;
  - (b) controlling the voice recognition processor to extract said voice feature parameter from the voice and the voice secret code of the driver having an intensity of a predetermined value or higher input from the microphone input unit, storing the extracted voice feature parameter in the parameter storage unit, and converting the current mode into a normal mode;
  - (c) instructing the voice recognition processor to read a corresponding prompt from the prompt storage unit and voice-synthesizing and then outputting the read result in order to ask the driver what the voice secret code is in the case that the driver intends to start the vehicle by inserting the vehicle key in the normal mode, that is, the key insertion discriminator determines that there has been a new key insertion;
  - (d) determining whether the intensity of the input voice is higher than the predetermined value through the voice strength discriminator if a voice is input;
  - (e) determining whether the driver is legally drink via the blood alcohol level measuring unit if the voice is louder than the predetermined value in step (d);
  - (f) comparing the feature parameter stored in the parameter storage unit during the voice secret code learning with the feature parameter of the voice via the microphone, if the driver is not determined to be legally drunk in step (e);
  - (g) outputting a control signal to drive said engine of the vehicle if it is judged as the same voice and voice secret code;
  - (h) identifying the voice secret code in order to identify whether the intended driver is an authorized driver in the case that said current mode is converted into said voice secret code learning mode by manipulation of the voice secret code rest button;
  - (i) outputting a voice prompt or guidance for resetting said voice secret code if the driver is an authorized driver; and
  - (j) extracting said voice feature parameter from the voice and the voice secret code of the driver input from the microphone input unit through the voice recognition processor and storing the extracted result in the parameter storage unit.

12. An apparatus for prevention of driving of motor vehicle under the influence of alcohol (DUI) and prevention of vehicle theft, the apparatus comprising:
- a microphone input unit for converting a voice of an intended driver into an electrical signal;
- a prompt storage unit containing prompts for voice prompt or voice guidance;
- a blood alcohol level measuring unit for determining whether the intended driver is legally drunk;
- a voice recognition processor for receiving the output of the microphone input unit, extracting a voice feature parameter therefrom and voice-synthesizing the prompts stored in the prompt storage unit to then output the synthesized result;
- a parameter storage unit for storing the voice feature parameter for the voice and voice secret code processed in the voice recognition processor, for one or more authorized drivers;
- a speaker for converting an electrical signal of the voice prompt or guidance which has been voice-synthesized in the voice recognition processor into a voice signal;
- an ignition drive for starting an engine of the vehicle;
- a vehicle key, input unit for receiving a vehicle key; and
- a controller for performing the steps of:
  - (a) instructing the voice recognition processor to read a corresponding prompt from the prompt storage unit and voice-synthesize and then output the read result for voice guidance in order to perform a voice secret code leaning;

(b) controlling the voice recognition processor to extract said voice feature parameter from the voice and the voice secret code of the driver having an intensity of a predetermined value or higher input from the microphone input unit, storing the extracted voice feature parameter in the parameter storage unit, and converting the current mode into a normal mode;

(c) instructing the voice recognition processor to read a corresponding prompt from the prompt storage unit and voice-synthesizing and then outputting the read result in order to ask the driver what the voice secret code is in the case that the driver intends to start the vehicle by inserting the vehicle key in the normal mode, that is, the key insertion discriminator determines that there has been a new key insertion;

(d) determining whether the intensity of the input voice is higher than the predetermined value through the voice strength discriminator if a voice is input;

(e) determining whether the driver is legally drunk via the blood alcohol level measuring unit if the voice is louder than the predetermined value in step (d);

(f) comparing the feature parameter stored in the parameter storage unit during the voice secret code learning with the feature parameter of the voice via the microphone, if the driver is not determined to be legally drunk in step (c); and (g) outputting a control signal to drive said engine of the vehicle if it is judged as the same voice and voice secret code.

13. An apparatus for prevention of driving of a motor vehicle under the influence of alcohol and prevention of vehicle theft, the apparatus comprising:

a microphone input unit for inputting a voice and a voice secret code of an intended driver;

a prompt storage unit containing prompts for voice prompt or voice guidance;

a blood alcohol level measuring unit for determining whether the intended driver is legally drunk;

a voice recognition processor for receiving the output of the microphone input unit, extracting a feature parameter therefrom and voice-synthesizing the prompts stored in the prompt storage unit to then output the synthesized result;

a parameter storage unit for storing the voice feature parameter of the voice and voice secret code processed in the voice recognition processor, for one or more authorized drivers;

a speaker for converting an electrical signal of the voice prompt or guidance which has been voice-synthesized in the voice recognition processor into a voice signal; and a controller for comparing the input voice feature parameter with the stored voice feature parameter unless the driver is determined to be legally drunk according to the blood alcohol level measurement and for controlling an engine of the vehicle to start if it is judged that the drive is an authorized driver.

* * * * *